Dec. 17, 1968 W. WHIGHAM 3,416,882
PRODUCTION OF VANADIUM VALUES FROM CRUDE OIL
Filed Dec. 8, 1965
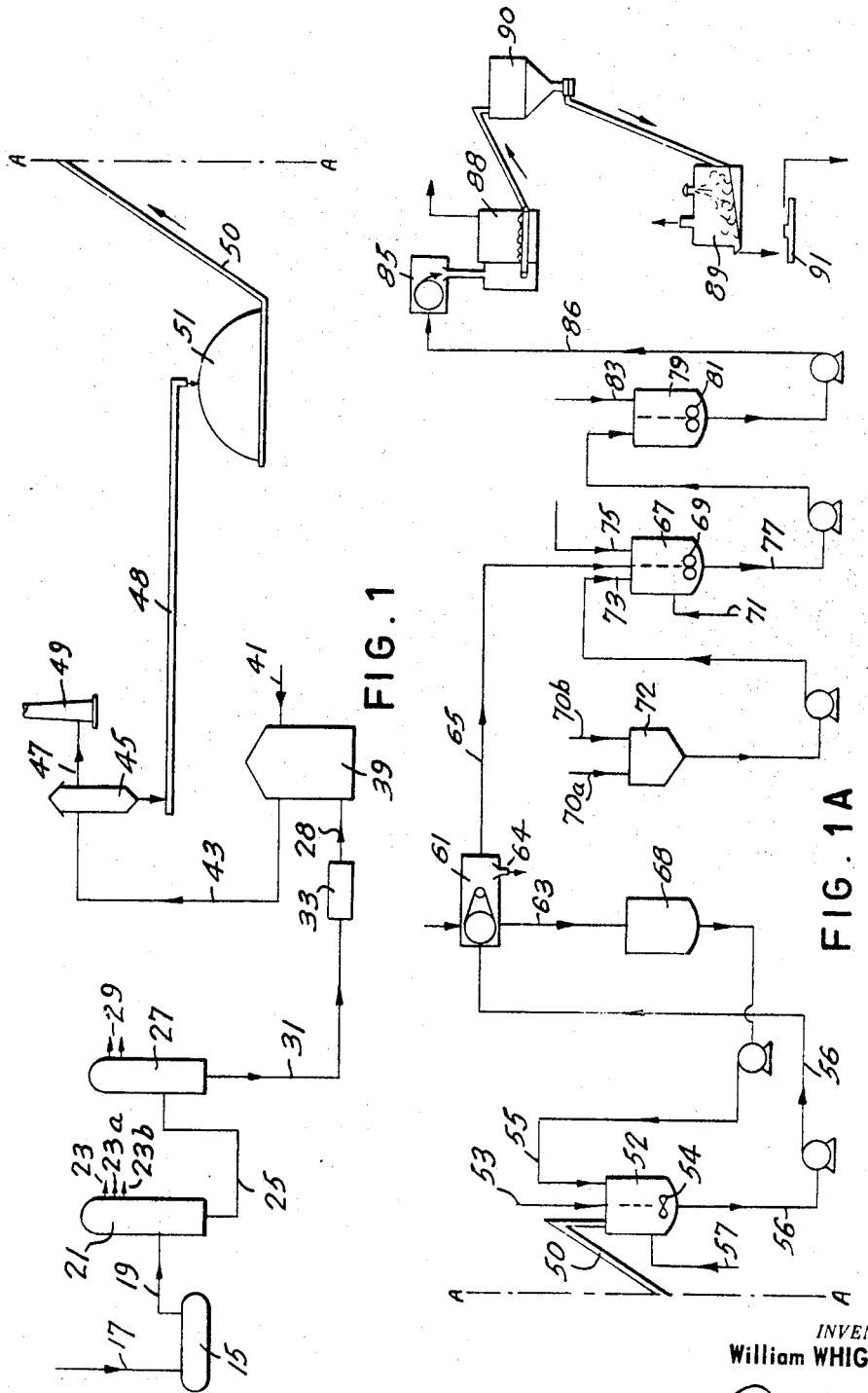
INVENTOR
William WHIGHAM
ATTORNEY United States Patent Office 3,416,882
Patented Dec. 17, 1968

3,416,882
PRODUCTION OF VANADIUM VALUES FROM CRUDE OIL
William Whigham, 7780 Ave. Dumail,
Ville d'Anjou, Quebec, Canada
Filed Dec. 8, 1965, Ser. No. 512,563
Claims priority, application Canada, Aug. 25, 1965,
939,105, Patent 752,773
12 Claims. (Cl. 23—15)

ABSTRACT OF THE DISCLOSURE

Process for obtaining a vanadium concentrate by desalting crude oil, fractionally distilling the desalting crude to obtain a residual oil component, from the residual oil obtaining a coke product which is ground to a fine mesh, the coke product is subsequently subjected to combustion and from the flue gas of the combustion, the solid particles are trapped and recovered to obtain a vanadium concentrate.

---

This invention relates to vanadium.

Vanadium is principally used in alloy steels, and its compounds are widely used in catalysts. It also finds further use in ink and enamel production, thus making it a valuable commodity.

Although vanadium is a fairly common element, comprising some 0.017% of the earth's crust, and ranking eighth in order of natural abundance of metals useful in structural purposes, its occurrence in a concentrated form is very rare. Indeed, the vanadium content of such concentrations rarely exceeds 2%.

Natural concentrations are brought about by the action of certain plants, micro-organisms and animals on vanadium in soil and sea-water, leading to deposits in limestone and phosphate beds and in crude petroleums; it is also a major constituent in many lead and uranium ores. Consequently, much of the vanadium produced in the past has been derived as a byproduct of metallurgical operations recovering other metals such as lead, uranium, etc. These sources of vanadium are gradually becoming depleted and in view of this, it has been necessary to turn to other fields for vanadium recovery.

Such an additional source of vanadium is petroleum or crude oil, which contains minor traces. However, the vanadium content in the petroleum has heretofore been considered to be too small to economically recover it according to existing technology.

The vanadium content in crude oil will vary according to the source of oil. Normally, the content will be from about 40 to about 130 parts per million, i.e., 0.004% to about 0.013% by weight. For example, crude North American oil usually contains less than 50 p.p.m., while crude oil from Venezuela contains about 130 p.p.m. Although this vanadium content is very minute, vast quantities of crude oil are processed daily in most refineries. Typically, the amount of crude oil processed runs to millions of gallons per day. In effect, these amounts of crude oil contain substantial quantities of vanadium in the form of their complexes which according to this invention can be recovered as the equivalent quantities of vanadium pentoxide ($V_2O_5$).

According to present day techniques, the processing of crude oil does not involve the consideration of recovering vanadium and consequently this product has normally been passed through as a waste product. That is, the quantities of vanadium in crude oil have heretofore been considered far too minute to economically and technologically recover. In fact, vanadium has previously been considered an undesirable impurity in any petroleum product and refiners and consumers have had to suffer with the vanadium being retained in the finished products.

APPLICANT'S DEVELOPMENT

Applicant has now developed a process for obtaining, according to one aspect of this invention, a vanadium concentrate from crude oil. According to another aspect of this invention, applicant has developed a process for recovering vanadium, as vanadium pentoxide, from crude oil by first producing a vanadium concentrate and subsequently processing the concentrate to obtain the $V_2O_5$.

According to the first aspect of this invention, there is provided a source of crude oil containing vanadium which is treated to remove undesirable water-soluble impurities such as sodium salts, e.g., sodium chloride. The resulting desalted crude oil is then subjected to fractional distillation to obtain distillates and a heavy residual oil. The residual oil is then passed to a coking process whereby further fractions of distillates are obtained in addition to a solid coke product. The solid product is then ground up to pass through as fine a mesh as possible, and subsequently the ground particles are placed in a combustion chamber togther with a suppotring fuel if required, where it is then burned. The flue gases resulting from the combustion process are then passed through means for removing the particles from the flue gases and the particles comprising a vanadium concentrate are recovered.

According to an alternative aspect of the above process, the residual oil obtained as one fraction of the distillation process may be directly passed to a combustion chamber where it is then burned. The flue gases resulting from the combustion are then screened or the solid particles are recovered in the above-defined manner to produce a vanadium concentrate.

According to the other aspect of this invention, the vanadium concentrate as produced above is leached with a leaching agent to dissolve the vanadium and form a slurry. The slurry thus obtained is purified by settling or by filtration and the vanadium values separated from the clear solution by oxidizing the latter whereby the vanadium is completely converted into a pentavalent state. The vanadium is then precipitated with a suitable agent such as ammonia and a hydrated precipitate is subsequently dried, fused and formed into flakes.

Having thus generally described the invention, reference will be made to the accompanying flow sheet illustrating diagrammatically an apparatus suitable for carrying out the process invention.

FIGURE 1 is a schematic diagram of an apparatus showing the first part terminating in line A—A; and FIG. 1A shows the balance of the apparatus continuing on from line A—A of FIGURE 1, also shown in schematic manner.

In the flow sheet, reference numeral 15 indicates an apparatus suitable for washing crude oil, entering the apparatus through a pipe line 17. In this operation, the crude oil which contains impurities such as water-soluble sodium salts, for example, sodium chloride, is treated. Typical crude oil may contain as much as twenty-five pounds or more of NaCl per one thousand barrels of oil and after the washing operation, the amount is reduced to less than one pound.

The crude oil leaves the washing apparatus 15 by means of conduit 19, and is fed to a fractional distillation apparatus 21.

In the distillation apparatus 21, the crude oil is processed into volatile distillates ranging from gases to heavy oils. These are taken off at various levels in the distillation tower, some of which are presented by reference to conduits 23, 23a, 23b, etc. As a further fraction of the distillation process, a heavy residual oil is obtained at the bottom of the apparatus which is removed from a conduit 25.

The residual oil is then, according to one embodiment of this process, fed to a fluid-coking unit 27 where it is thermally cracked to yield further distillate materials which are taken off through conduit 29. Additionally, a solid residual material (solid below the temperatures used in the coking unit), is obtained, which is removed through conduit 31. The product obtained is a solid hard particulate petroleum coke.

The coke product is then fed to a crushing mill 33 where the latter is broken up to pass through as fine a mesh as possible.

The coke particles are then fed from the crushing mill 33 through conduit 28 to a combustion unit 39 where a supporting fuel, if required, is mixed with the coke particles. The supporting fuel is fed into the combustion chamber 39 through conduit 41.

The mixture is then ignited and the flue gases resulting from the combustion of the mixture are exhausted through pipe 43 and fed into an electrostatic precipitator 45. In the electrostatic precipitator, the particles carried in the flue gases containing vanadium are precipitated in an almost quantitative amount. The exhaust gases from the electorstatic precipitator are removed through conduit 47 then passed through stack 49, while the precipitate consisting of a vanadium concentrate is removed from the bottom of the precipitator by means of a conveyor 48 which leads the concentrate to a storage bin indicated by reference numeral 51.

Where, according to the alternate aspect of the applicant's invention, the solid coke product is taken directly from the unit 27 to the combustion chamber 39, the use of the crushing mill 33 is eliminated.

The use of the storage bin 51 permits the enriched vanadium product to be stored until it can be used in the following steps.

The vanadium concentrate is then fed into an extraction vessel 52 by means of a conveyor 50. The vessel 52 is heated by suitable means, such as conduit 57. The vessel 52 functions to recover the vanadium values from the concentrate. The vessel 52 contains provision for the addition of suitable extraction agents, such as, sulfuric acid, to be fed therein through conduit 53, in addition to water through conduit 55. The water added in this case is partly or entirely recycled washwater taken from another step of applicant's process which will be mentioned later on. The vessel 52 also includes means for agitating the mixture, identified by reference numeral 54.

After the vanadium content of the concentrate is brought into solution, the resulting mixture is taken off through conduit 56 and passed through a filter 61 in which the solid materials are separated and led off through a conduit 64 with the filter wash being removed through conduit 63. The resulting extraction liquor or filtrate is removed from the filter 61 by means of a conduit 65 into a precipitation vessel 67 provided with agitation means 69. The wash-water removed is stored in a vessel 68 until it is required for use in the extraction apparatus 52.

The vessel 67 is heated by means of a conduit 71 and contains inlet conduits 73 and 75 for addition of the precipitating agents. In the apparatus 67 the vanadium values are oxidized. Reference numeral 72 indicates a storage tank for storing the agents used in the apparatus 67, and feed-lines 70A and 70B permit the addition of the agents to the tank 72. After precipitation, the contents of the precipitation vessel are taken-off through a conduit 77 and fed into a slurry tank 79 also provided with agitation means 81. The tank is equipped with a conduit 83 to permit entry of water if required to improve the characteristics of the slurry.

From the slurry tank, the slurry is passed to a filter 85 by means of a conduit 86 where the slurry is filtered. The resulting water-washed filter cake is then extruded onto a belt passing through a drying apparatus 88, which belt passes the product to a storage bin 90. In passing through the dryer 88, the product is dried to an extent where the entrained water and chemically combined water is removed, resulting in a product which is of approximately 99% purity.

In the final stage, the vanadium pentoxide product is fused by means of a furnace 89 and the resulting product cast in a casting wheel 91 to produce a ribbon of vanadium pentoxide. In this last operation, the vanadium pentoxide ribbon can be fed into a chopper (not shown) which breaks it into flakes and the flakes subsequently discharged into drums in which the product is normally shipped.

In carrying out the process of this invention, the step of treating the crude oil to remove undesired impurities and to provide a product having substantially the same general vanadium content as the crude oil may be performed by any suitable means. Normally, the crude oil is water-washed to remove in particular the water-soluble sodium salts, for example, sodium chloride. This de-salting operation is highly desirable since in subsequent steps carried out by the applicant's process, the removal of the sodium prevents the formation of sodium and vanadium complexes which would otherwise lead to serious problems. Applicant prefers to remove the sodium chloride content of the crude oil to the extent where less than 1 pound of sodium chloride is all that remains in about 350,000 pounds of crude oil. This amounts to about 2 parts per million of sodium chloride in the crude oil.

The step of fractionally distilling the crude oil is well-known in this art and this process removes the lighter materials as crude distillates ranging from the light gases to the heavy gas oils. From this step, applicant recovers the heavy black residual oil which remains and in which substantially all of the vanadium from the crude oil is concentrated. Normally, the residual heavy black oil has been used in the past for different purposes, such as bunker oil, asphalt production, etc. where the vanadium content has been lost for recovery purposes. However, according to this invention the vanadium content is recovered. In fact, the vanadium content of bunker oil has heretofore been considered a contaminant leading to problems in furnaces and boiler tubes due to the formation of sodium and vanadium complexes which attack metal and the firebrick.

In the fluid coking process, the residual oil is thermally cracked where the nonvolatile vandium-containing compounds are concentrated in the residual material, i.e., the fluid coke product. This product is obtained in the form of very hard small spheroidal particles, free from dust, which normally flow like ordinary table salt. The spheroidal particles have a structure similar to that of an onion, i.e., the particles are composed of rings or layers one on top of another and which have a high sulfur content, normally in the range of about 6 percent. These particles are relatively free from dust. The process conditions used in this step of applicant's operation are well known in this art and for this reason, will not be gone into in any detail. It suffices to say that the process is basically that normally used as a thermocracking process to recover the desirable light products from the less valuable residual products obtained by the previous fractional distillation step. In this step of applicant's process, the vanadium content of the residual oil which is between about 400 and about 600 parts per million, is upgraded to about 4,000 parts per million. This product, whenever it was produced in the previous known operations, was typically used for firing steam boilers to recover its energy and supply other operations with the required heat.

In the subsequent step of this invention, that of pulverizing the coke product, any suitable means for grinding the product to as fine a mesh as possible can be used. For example, ball mills, hammer mills, rod mills, etc. can be used for this purpose. In general, the finer the coke is ground, the more desirable the product is for subsequent operations. Preferably, a minimum of 80 percent of the ground coke should pass through a 200 mesh screen. The reason for grinding the coke to as fine a mesh as is possible to get is to obtain a product which will burn efficiently. It would be obvious to those skilled in the art that a higher mesh could be used to obtain a more coarse product, but it will be recognized that to effectively burn such a product would be difficult.

In the case where the pulverized coke product is fed into the combustion chamber, normally a supporting fuel is required in order to provide a suitable combustion mixture. This fuel may either be oil or various gases. Typical examples include natural gas and fuel oils, etc.

As a product of the combustion process, there is produced a fly ash in the flue gas. The vanadium compounds are contained in this fly ash and by means of a suitable apparatus to collect the fly ash, the vanadium content is recovered from the flue gases from the combustion process. The characteristics of the fly ash will vary according to the coke product which is subjected to the combustion process, and normally will contain a number of other products in addition to the vanadium components. As recovering means for the fly ash, there may be used various types of precipitators, such as the device commonly called "electrostatic precipitators" which deposit electrostatically the particles contained in the flue gas. Alternately, there may be used various types of filter media which are capable of trapping and entraining the vanadium bearing particles contained in the flue gas.

Applicant has found that by using an apparatus of the type commonly known as an "electrostatic precipitator," the vanadium content in the flue gas can substantially quantitatively be removed and deposited as a fly ash.

Using a typical crude oil and processing it according to this invention, the characteristics of the typical fly ash might be as follows:

| | Wt. percent |
|---|---|
| Petroleum coke and catalyst dust | 57.8 |
| Vanadium as $V_2O_5$ | 15.5 |
| Nickel as NiO | 1.9 |
| Ca as $CaSO_4$ | 2.5 |
| Na as $Na_2SO_4$ | 5.6 |
| Fe as $FeSO_4$ | 0.7 |
| $Al_2O_3$ | 7.7 |
| $SiO_2$ | 8.2 |
| | 99.9 |

According to a typical operation of this invention, the following table shows the particle size distribution of a fly ash similar to the above:

| Micron size: | Wt. percent |
|---|---|
| +60 | 13.0 |
| +40–60 | 0.0 |
| +30–40 | 1.2 |
| +20–30 | 1.3 |
| +15–20 | 2.6 |
| +10–15 | 6.5 |
| +7.5–10 | 5.2 |
| +0.0–7.5 | 70.2 |

As will be seen from the first table, the fly ash is contaminated with proportions of catalyst dust and unburned coke particles from previous operations, but these do not interfere with the subsequent processing of the fly ash, according to this invention. The fly ash product, i.e., vanadium concentrate, may be stored until required, such as disclosed with reference to the accompanying drawing. Alternately, this may be fed directly to an extraction process in which the vanadium content of the vanadium concentrate is separated from the other components of the concentrate.

From the extraction step, the solution is filtered whereby the filtrate consisting of concentrated extraction liquor is subsequently fed to an oxidation step. The filtrate is washed and undesired solid impurities removed by the step of filtering the extraction material are discarded. However, the water wash may be recycled for re-use in the extraction process, if desired. Applicant prefers to carry out the filtration step at a temperature of about 120° F., although as will be understood, this may vary depending on the exact nature of the filtration conditions.

The filtrate thus obtained, consisting of a concentrated extract liquor, is subsequently oxidized in order to convert the vanadium values to the pentavalent form. The oxidation is preferably carried out in an aqueous solution by the use of a suitable oxidizing agent such as sodium chlorate, hydrogen peroxide, etc. Sodium chlorate is a preferred oxidizing agent due to its availability and inexpensive characteristics. The oxidation is preferably carried out at a temperature of about 150° F., although the reaction proceeds at lower temperatures while higher temperatures tend to cause loss of the oxidizing reagent through the excessive evolution of free chlorine gas. The pH of the solution in which oxidation is carried out is not critical and may vary over wide ranges.

When the oxidation step of applicant's process is carried out, the colour of the vanadium solution changes from a blue or green to a yellow. When the oxidation is completed, the solution is then subjected to the following step. Following the step of oxidation, the vanadium in the solution is then precipitated by the addition of a suitable agent, for example, ammonia, preferably anhydrous. Desirably, the precipitation is carried out at a temperature of between 180° to about 200° F. and at a pH of from about 1.7 to about 2.1. However, it will be understood by those skilled in this art that the precipitation can be carried out at varying temperature ranges but due to the nature of the chemical reaction involved, it is desirable to operate as near as possible to the boiling point of the solution. The higher the temperature, the greater the yield and the lower amount of time involved to carry out the reaction. At a lower pH value, the vanadium recovery is lessened and at a pH value of about 2.0 iron impurities present in the solution may precipitate in substantial quantities which is undesirable. Also, at a high pH value, the process will involve excessive use of chemical reactants resulting in an increased cost for reactants.

After precipitation, the vanadium precipitate is filtered and washed to remove impurities if such are present. The filtrate and wash water are removed and the filter cake consisting of hydrated vanadium compounds is extruded and passed through a dryer where the entrained and chemically combined water is removed resulting in an anhydrous $V_2O_5$ product having a purity of about 99%. The anhydrous $V_2O_5$ is a powdery material.

If desired, the $V_2O_5$ may be fused and cast into flakes, the form in which $V_2O_5$ is normally marketed. This may be accomplished by use of a furnace to fuse the $V_2O_5$. Temperatures normally employed are in the range of 2,000° F. and an oxidizing atmosphere is normally maintained in order to prevent the reduction of the $V_2O_5$ to lower oxides which may be refractory.

In casting the fused $V_2O_5$, any apparatus suitable for this purpose can be used. Normally, this is a casting wheel consisting of a metal disc and cooled by suitable means, such as internally circulated water. The fused $V_2O_5$ pours onto the wheel where it forms a thin ribbon which solidifies substantially upon contact. As the wheel rotates, the ribbon is fed through a chopper which breaks it up into flakes. The flakes can then be discharged into drums in which the product is shipped.

Reference will now be made to the following example, illustrating a typical process according to one aspect of this invention.

A batch of vanadium concentrate weighing about 6,000 lbs. and containing about 1,000 lbs. of vanadium, calculated as $V_2O_5$, was produced over a period of 48 hours and charged to the extraction vessel continuously over this period of time as it was produced. The composition of the concentrate was approximately as follows:

| | Lbs. |
|---|---|
| Vanadium as $V_2O_5$ | 1,000 |
| Kaolin catalyst fines | 700 |
| Petroleum coke | 4,200 |
| Iron, nickel, silica | 100 |

The concentrate consisted of a fine powder, of small particle size, the bulk of the material having a particle size of less than 10 microns. The material was poisonous, because of its vanadium content, easily dispersed into the atmosphere by air currents, so that its recovery and utilization represents a significant diminution of air pollution in the vicinity of the plant, since otherwise the material would be discharged to the atmosphere as a boiler fly ash.

The concentrate was introduced into the reaction vessel which contained 1,200 gallons of wash water from the previous batch together with 3,000 lbs. of fresh 98% sulphuric acid. The temperature was maintained at about 150° F. during the 48-hour period in which the addition took place, and during this period the bulk of the vanadium passed into solution in the acid phase.

The slurry thus formed was filtered at a temperature of 100–130° F. over a period of 4 hours. During this period the solids retained by the filter were washed with approximately 1,200 gallons of water to remove entrained vanadium solution from the filter cake. After the filtration was complete the filtrate contained about one pound vanadium per gallon (as $V_2O_5$) and the washings contained about 0.6 lb. The washings were retained to serve as make-up water in the next batch, so that the vanadium values were not lost.

The filter cake, which was discarded, was dark gray in colour, contained about 35% of moisture and also contained 0.8% by weight of insoluble vanadium (as $V_2O_5$) and also about 0.2% of dissolved vanadium.

The filtrate was dark blue in colour, due to the reduction of the vanadium to a valency state lower than 5. The mechanism of this reduction during solution is not clear, but may stem in part at least from the presence of traces of $SO_2$ in the commercial grade $H_2SO_4$. The filtrate contained 0.02% by weight of filterable solids, consisting mainly of fine coke particles, which are oxidized in subsequent processing so that these solids represent only about 0.2% by weight of the vanadium content.

The vanadium in the filtrate was oxidized to the pentavalent form by the addition of an aqueous solution containing 200 lbs. of sodium chlorate. The temperature of the solution was maintained at about 120° F. during the oxidation, but the temperature is not critical in this stage of the process. The pH of the solution was close to zero.

After oxidation the pH was raised to about 1.8, and the temperature to 200° F. Under these conditions the vanadium was precipitated over a 2-hour period. After settling for one hour the liquid phase was decanted from the solid vanadium compounds as completely as possible, and the vanadium compounds were washed by decantation with water to remove as much as possible of soluble impurities such as iron and nickel.

The washed precipitate was filtered on a drum filter and dried in the drying oven at 600° F. for 15 minutes. This reduced the moisture content of the precipitate to less than 1%.

The dried precipitate was then introduced into the fusion furnace, the temperature of which was about 2,000° F. The fused product was cast into flakes which had the following composition.

| | Percent |
|---|---|
| Vanadium (as $V_2O_5$) | 98.1 |
| Iron (as $Fe_2O_3$) | 1.0 |
| Nickel (as NiO) | 0.2 |
| Titanium (as $TiO_2$) | 0.1 |
| Acid-insoluble material | 0.6 |

The total yield of fused vanadium pentoxide was about 900 lbs.

I claim:
1. A process for preparing a vanadium concentrate which comprises the steps of washing crude oil containing vanadium to remove water-soluble impurities therefrom, thereby to obtain desalted crude oil; subjecting the latter to fractional distillation to obtain vanadium poor distillates and vanadium enriched residual oil; subjecting the residual oil to a fluid coking process to obtain vanadium poor distillates and a vanadium enriched coke product; grinding said coke product to a fine mesh; passing the finely ground coke to a combustion chamber and burning the coke; passing the flue gases produced by said burning through means for separating the vanadium containing solid particles contained in the flue gas from the remainder of the flue gas; and recovering the separated vanadium containing solid particles as a vanadium concentrate.

2. A process for producing a vanadium concentrate from a source of crude oil containing vanadium and undesired impurities which would adversely affect the processing of the concentrate comprising: washing the crude oil to remove undesired water soluble impurities therefrom to provide a product having substantially the same general vanadium content as the unwashed crude oil; subjecting the washed crude oil to fractional distillation to obtain vanadium poor distillates and a heavy residual oil containing the vanadium values in said crude oil; subjecting said residual oil to further heating to obtain a further vanadium poor volatile portion and a solid petroleum coke fraction containing the vanadium values in said crude oil; pulverizing said petroleum coke fraction; feeding the pulverized coke to a combustion chamber; feeding a supporting fuel to said combustion chamber and burning said pulverized coke and supporting fuel to produce a flue gas containing vanadium containing particles; and separating said vanadium containing particles from said flue gas, and recovering said particles as a vanadium concentrate.

3. A process, as defined in claim 2, wherein the petroleum coke fraction is ground to a fine particle size whereby on combustion, an ash residue having a particle size of about 85% below 60 microns is obtained.

4. A process, as defined in claim 2, wherein the residual oil resulting from fractional distillation step is burned directly without having been subjected to further processing and grinding and the vanadium containing solid particles are separately recovered from the combustion products.

5. A process, as defined in claim 2, wherein the vanadium containing solid particles are separated from the flue gas by electrostatic precipitation.

6. A process, as defined in claim 2, wherein the crude oil contains between about 40 and about 130 parts per million of vanadium values, the distillation product having a vanadium content between about 400 and about 600 parts per million, and the product obtained by subjecting the residual oil to further heating contains about 4,000 parts per million of vanadium content.

7. A process, as defined in claim 1, which comprises the further steps of leaching the vanadium content from the vanadium containing solid particles to obtain a vanadium containing extract; removing undesired impurities from said extract; oxidizing the vanadium values in said extract to convert the vanadium therein to its pentavalent form; and recovering substantially pure vanadium pentoxide therefrom.

8. A process which comprises the steps of forming a slurry of the vanadium containing solid particles obtained by the process of claim 2; leaching the vanadium values therefrom; filtering the slurry to separate a vanadium poor solid residue from a filtrate containing the vanadium values; oxidizing the vanadium values in the filtrate to the pentavalent form; precipitating the pentavalent vanadium values from said filtrate and recovering the substantially pure vanadium pentoxide so precipitated.

9. A process which comprises the steps of forming a slurry of the vanadium containing solid particles obtained by the process of claim 1; leaching the vanadium values therefrom; filtering the slurry to separate a vanadium poor solid residue from a filtrate containing the vanadium values; oxidizing the vanadium values in the filtrate to pentavalent vanadium; precipitating the pentavalent vanadium from said filtrate and recovering the substantially pure vanadium pentoxide, so precipitated.

10. A process which comprises the steps of forming a slurry of the vanadium containing solid particles product obtained by the process of claim 2; leaching the vanadium values therefrom; filtering the slurry to separate a vanadium poor solid residue from a filtrate containing the vanadium values; oxidizing the vanadium values in the filtrate to pentavalent vanadium; precipitating the pentavalent vanadium from said filtrate and recovering the substantially pure vanadium pentoxide, so precipitated.

11. A process for recovering substantially pure vanadium pentoxide from a crude oil containing vanadium, which comprises the steps of washing said crude oil containing vanadium to remove water-soluble impurities therefrom and to thereby obtain a desalted crude oil; subjecting the latter to fractional distillation to obtain vanadium poor distillates and residual oil containing the vanadium values in said crude oil; subjecting the residual oil to a fluid coking process to obtain vanadium poor distillates and a coke product containing the vanadium values in said crude oil; grinding the vanadium containing coke product to a fine mesh; passing the finely ground coke to a combustion chamber and burning the finely ground coke in said combustion chamber with supporting fuel, if required; producing flue gases containing solid particles; separating the gases in said flue gas from the vanadium rich solid particles contained in said flue gas and recovering the solid particles which comprise a concentrate of the vanadium values originally in said crude oil; forming a slurry of the solid particles; leaching the vanadium values therefrom; filtering the slurry to separate a vanadium poor solid residue from a filtrate containing the vanadium values; oxidizing the vanadium values in the filtrate to the pentavalent form of vanadium; precipitating the pentavalent vanadium from said filtrate and recovering the substantially pure vanadium pentoxide, so precipitated.

12. A process, as defined in claim 11, which comprises the further steps of fusing the product obtained, and casting the fused product into flakes.

References Cited

UNITED STATES PATENTS

| 2,176,610 | 10/1939 | Stamberg. |
| 2,298,464 | 10/1942 | Burwell _____ 23—140 |
| 2,372,109 | 3/1945 | Noel. |

EARL C. THOMAS, *Primary Examiner.*

H. T. CARTER, *Assistant Examiner.*

U.S. Cl. X.R.

23—17, 140